G. FROH,

Assignor to J. SPEAR.

Stove Grate.

No. 9,463. Reissued Nov. 16, 1880.

*Witnesses.*

Geo. B. Collier

James Spear

*Inventor:*

George Froh, by Collier & Bell,

Attys.

N. PETERS, PHOTO-LITHOGRAPHER, WASHINGTON, D. C.

UNITED STATES PATENT OFFICE.

GEORGE FROH, OF PHILADELPHIA, PENNSYLVANIA, ASSIGNOR TO JAMES SPEAR, OF SAME PLACE.

STOVE-GRATE.

SPECIFICATION forming part of Reissued Letters Patent No. 9,463, dated November 16, 1880.

Original No. 100,024, dated February 22, 1870. Application for reissue filed July 2, 1880.

*To all whom it may concern:*

Be it known that I, GEORGE FROH, of the city and county of Philadelphia, in the State of Pennsylvania, have invented certain new and useful Improvements in Grates for Stoves, of which improvement the following is a specification.

My invention relates to grates of circular form, in plan, which are used in most of the modern cylindrical stoves for heating, and to which a vibrating motion in a horizontal plane is given for the purpose of raking the fire and removing the ashes from the burning coals. These grates are usually so arranged that their entire contents may be removed by dropping either the whole grate or a portion of the same, or by giving it a rotary motion on a horizontal axis, the grate being held in its horizontal position by a sliding pin or other suitable appliance.

The object of my invention is to provide a stove-grate of such construction as that it may be either shaken so as to free the burning coal from ashes or separated so that the entire contents may be emptied, the construction and mode of operation of the grate serving to cause a complete discharge of the ashes without the use of a poker or other detached implement.

To this end my improvements consist, first, in constructing a dished or concave sectional or two-part grated fire-bed, so as to be capable of a vertical division or separation at or near its center, and with a pivot, hinge, or center of motion above the bottom or fuel-bed of the grate, whereby said grate is adapted to be opened on the line of division to admit of the downward discharge of its contents; secondly, in constructing a dished or concave sectional or two-part grate, so that it may be divided vertically at or near its center, and adapting it to be opened on the line of division to admit of the downward discharge of its contents without requiring that any part of said grate shall fall or descend below the position occupied by it in sustaining fuel; thirdly, in constructing a dished or concave stove-grate in two halves or sections, which may be vibrated as a unit about a vertical center line and partially separated on a line at right angles thereto, to provide for and afford a downward discharge of the contents of the grate; and, fourthly, in combining with a dished or concave grate formed of two hinged sections a shaking and dumping handle, all as hereinafter more fully set forth.

Figure 1:
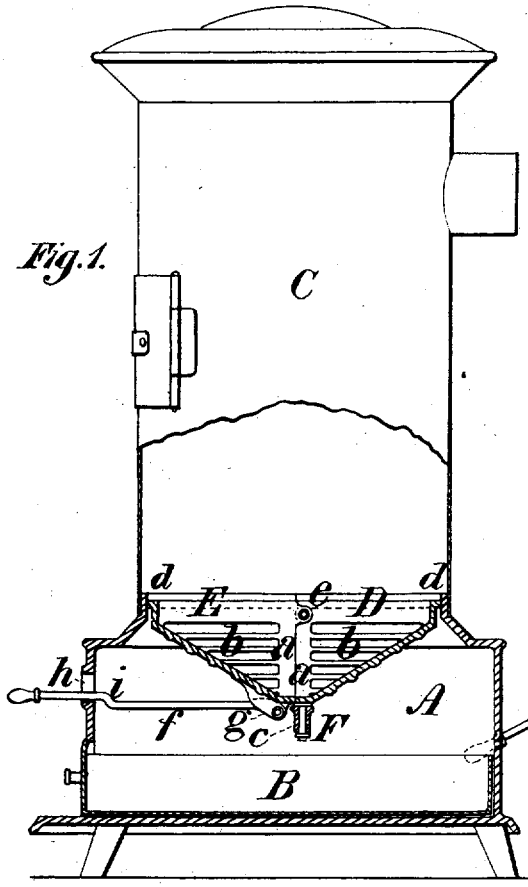
Figure 2:
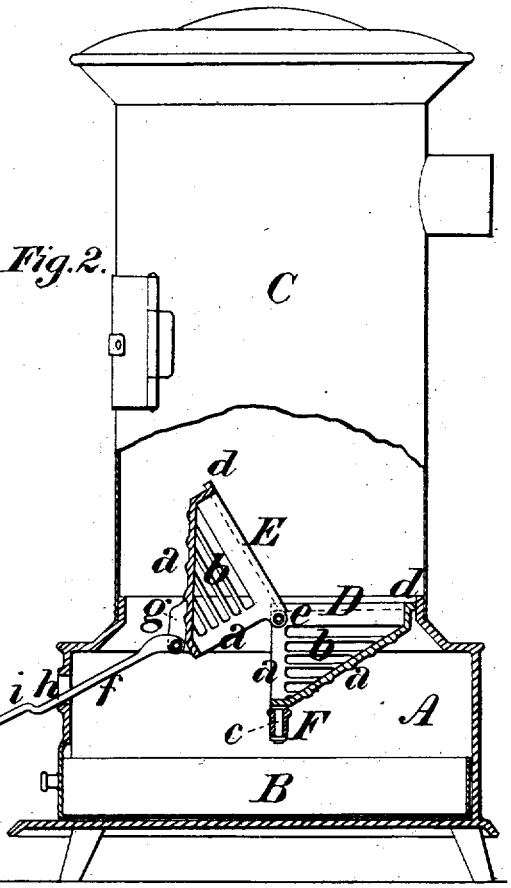
Figure 3:
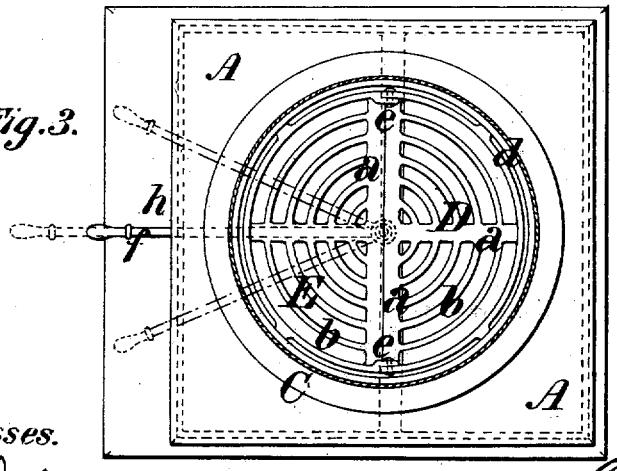

In the accompanying drawings, Figure 1 is a side elevation, in section, of a stove embodying my invention, with the improved grate in position for holding the fuel. Fig. 2 is a similar sectional view, showing the manner of actuating the front section of the grate for the removal of the entire contents. Fig. 3 is a plan of Fig. 1.

A is the square base of the stove, provided with an ash-pan, B, and carrying a cylindrical drum, C.

The improved grate consists of a rear section, D, and front section, E, the two forming a conically-dished receptacle, with radial bars *a a* and annular bars *b b*. The section D is, at its apex, provided with a pivot, *c*, which rests and turns in a support, F, attached to A. The whole grate is also steadied at the top by outward projections, *d d*, on its annular rim, which bear loosely against the inside of the cylindrical top of A.

E is hinged to D near the top, at *e e*, and provided with a peculiarly-formed shaking and dumping handle, *f*. This handle is jointed to the bottom of E near the center, and is fitted between flat lugs *g* in such a manner that a vibrating motion may be imparted to the whole grate by moving this handle laterally within the limits of the oblong opening *h* in A, as seen in dotted lines in Fig. 3. The handle *f* is provided with an offset, *i*, to prevent any undue outward movement and consequent opening of the joint between sections D and E of the grate. When, however, the contents of the grate are to be entirely emptied it is only requisite to slightly raise the handle *f*, so as to allow its offset *i* to pass through opening *h*, and then to withdraw *f* and throw it and section E into the position shown at Fig. 2, thus discharging the whole contents of the grate into the ash-pan B, the conical form of the grate facilitating greatly the entire discharge of that part of the contents lying over the stationary rear section, D.

I do not desire to confine the use of my improvement to the precise form of dished grate as shown in the annexed drawings, as this may be of a spherical or other concaved shape without materially impairing the improvement.

I claim as my invention and desire to secure by Letters Patent—

1. A grated fire-bed constructed in two sections, connected by an intermediate pivot or hinge, to admit of the partial separation of the sections for the purpose of discharging the contents of the fire-bed.

2. A dished or concave sectional or two-part grated fire-bed divided vertically at or near its center, and having a pivot, hinge, or center of motion above the bottom or fuel-bed of the grate, whereby said grate is adapted to be opened on the line of division to admit of the downward discharge of its contents.

3. A dished or concave two-part grated fire-bed divided vertically at or near its center, and adapted to be opened on the line of division to admit of the downward discharge of its contents without any part of said grate falling or descending below the position occupied by it in sustaining fuel.

4. A dished or concave stove-grate composed of two halves or sections, which are vibratable as a unit about a vertical center line and partially separable on a line at right angles thereto, to provide a downward discharge for the contents of the grate.

5. The combination, with a dished or concave grate formed of two hinged sections, substantially as set forth, of a shaking and dumping handle.

GEO. FROH.

Witnesses:
JOSEPH N. DOUGHERTY,
RUDOLPH L. NEFF.